United States Patent

[11] 3,622,333

[72] Inventor Oswald James Cope
Santa Cruz, Calif.
[21] Appl. No. 866,753
[22] Filed Oct. 15, 1969
[45] Patented Nov. 23, 1971
[73] Assignee Micrex Corporation
Santa Clara, Calif.

[54] EPOXY RESIN VEHICLE FOR VESICULAR FILM
6 Claims, No Drawings

[52] U.S. Cl. .......... 96/75, 96/49, 96/91
[51] Int. Cl. .......... G03c 1/52, G03c 1/60
[50] Field of Search .......... 96/75, 91, 49

[56] References Cited

UNITED STATES PATENTS

| | | | |
|---|---|---|---|
| 3,189,455 | 6/1965 | Daech | 96/91 |
| 3,251,690 | 5/1966 | Parker | 96/91 X |
| 3,260,599 | 7/1966 | Lokken | 96/91 X |
| 3,383,213 | 5/1968 | Notley et al. | 96/91 X |
| 3,485,631 | 12/1969 | Notley | 96/91 X |
| 3,498,786 | 3/1970 | Notley et al. | 96/91 X |

OTHER REFERENCES

Lee et al., " New Linear Polymers," 1967, pages 19, 50–54, principally relied upon.

*Primary Examiner*—Harold Ansher
*Assistant Examiner*—Joseph C. Gil
*Attorney*—Townsend and Townsend

ABSTRACT: Vehicle for vesicular film having improved image stability particulary at higher temperatures as well as improved stability of the vehicle itself at higher temperatures and in integrity of its chemical structure. The vesiculating agent is carried in a thermoplastic linear polyhydroxyether polymer of an epihalohydrin such as epichlorohydrin and a dihydric phenol such as 2,2′-bis(p-hydroxyphenyl) propane.

EPOXY RESIN VEHICLE FOR VESICULAR FILM

This invention relates to vesicular film. More particularly, the invention relates to the use of a thermoplastic linear epoxy resin as the vehicle for the vesiculating agent.

Numerous resins have been suggested for use as the vehicle in vesicular film. The present invention employs a relatively recently developed type of epoxy resin for this purpose. In addition to providing all of the normal and desirable attributes in a vehicle for vesicular film, the resin of this invention has significant advantages over resins most commonly used to date. In accordance with the present invention a film-forming thermoplastic linear polyhydroxyether of an epihalohydrin and a dihydric phenol is employed as the vehicle within which a sensitizer capable of generating nitrogen upon exposure to radiation is dispersed. These resins, which may also be termed epoxy resins because of the presence of epoxy groups, have relatively high (about 100° C.) glass transition temperatures so that the vesicles which constitute the development image when the film is used for recording information are relatively stable below this temperature. In contrast, many of the polymers recommended for vesicular film because they have suitable diffusivity and permeability characteristics, have much lower glass transition or softening temperatures. Vesicular films made with these other vehicles are far less stable at higher temperatures with attendant loss of definition of the recorded image. Vesicular film made with the present vehicle is capable of preserving recorded images without substantial reduction in the density and contrast of the recorded image even at relatively higher temperatures.

The epoxy resins used as a vehicle in the present invention are extremely chemically and thermally stable. For example, these resins can be melt processed at temperatures in excess of 200° C. The backbone structure of carbon-carbon covalent bonds and ether groupings is responsible for hydrolytic stability of the polymer chain. In addition, the resins do not have substituents which easily undergo elimination of cyclization reactions to further enhance its chemical and thermal stability. Such properties represent substantial improvements over commonly used resins in commercial vesicular film. For example, typical commercial vesicular film employ polymers of vinyl chloride and vinylidene chloride. Initially, such vehicles are more difficult to work with in that they cannot melt processed without thermal stabilizers or plasticizers. A practical detriment to their use is that at temperatures close to room temperatures, vinylidene chloride polymers for example easily undergo dehydrohalogenation in the presence of acid or base catalysts. Hydrogen chloride gas is liberated with corrodes surrounding equipment and containers for the film. No such problems are encountered with the present vehicle.

In accordance with the preferred embodiment of this invention, a vesiculating agent is dispersed in a highly linear film-forming epoxy polymer of an epihalohydrin and a dihydric phenol selected from dihydroxy benzenes and compounds of the formula:

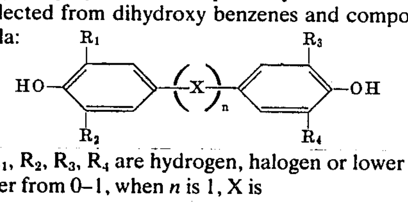

wherein $R_1$, $R_2$, $R_3$, $R_4$ are hydrogen, halogen or lower alkyl; $n$ is an integer from 0–1, when $n$ is 1, X is $-CH_2-$, $-C(CH_3)_2-$, $-CH(CH_3)-$, $-CH(CH(CH_3)_2)-$

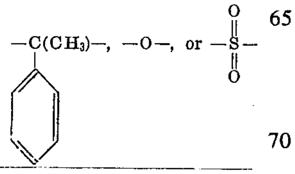

Contemplated within these groupings are polymers made from an epihalohydrin, preferably epichlorohydrin and a dihydric phenol which may have a single aromatic ring as in the case of m-dihydroxy benzene or a multiple aromatic ring structure such as 2, 2′-bis(p-hydroxyphenyl) propane commercially known as Bisphenol A. A number of polymers within the above general formula are described in terms of preparation and properties in detail in "New Linear Polymers, "by Henry Lee, Donald Stoffey and Kris Neville, published by McGraw Hill, 1967, pp. 19–60, this prior art being incorporated herein by reference. A number of commercially available materials representing resins of this type are obtainable. These commercial epoxy resins are usually made from epichlorohydrin and Bisphenol A. The principal variations of the commercial resins are in the area of molecular weight distribution, amount of epoxy groups, and the solvent used. Such variations are not particularly significant for purposes of the present invention.

All thermoplastic linear (relatively little or no cross-linkages) epoxy resins of the indicated type are contemplated provided they have a nitrogen diffusivity which permits internal formation of record defining bubbles of nitrogen liberated in the film when exposed to radiation and developed. It is understood in the art that a vehicle having such a diffusivity will necessarily have the type of permeability which allows the film to be fixed and residual nitrogen-liberated. The only other limitation on the selection of epoxy resins is that they have sufficiently high molecular weight to form a coherent film.

The epoxy resins of this invention should be distinguished from the older and more well-known casting and encapsulating form of epoxy resins which contain a secondary component, usually a diamine, which serves to cross-link the epoxy component. The present epoxies are highly linear and thermoplastic whereas the cross-linked variety provides thermoset infusable epoxy products.

For completeness, it should be noted that the presence or absence of terminal epoxy groups has no significant effect on the practice of the present invention. Some of the commercially available resins have been made by a process which removes terminal epoxy groups. This removes any possibility of cross-linking through the epoxy groups. Other commercially available thermoplastic linear resins of this invention may contain terminal epoxy groups. Any cross-linkage which may occur through them does not affect the suitability of the resins, the resins still being substantially linear.

The application of the entire group of linear epoxies can be determined from permeability data for the resins. Because permeability and diffusivity are interrelated, permeability properties alone can be used for selection of a suitable resin. Permeability data for a variety of the presently utilized resins is given in "New Linear Polymers" supra, as well as in Journal of Applied Polymer Science 7:2135–2144. The data shows that the use of differing dihydric phenols in the formation of an epoxy polymer of the present type has only a slight effect on its barrier properties.

Aside from the use of linear epoxy resins, the present invention is consistent with all prior art procedures for making a vesicular film and the details of the prior art can be followed in all respects simply by substituting the present epoxies for the resinous vehicles of the prior art. For this reason the other ingredients and procedures to be used in combination with the epoxy resins will be only briefly summarized at this point.

Radiation-Sensitive Vesiculating Agent

The vesiculating agent is sensitive to radiation, usually light, so that exposure to the radiation causes decomposition and formation of nitrogen. Examples of suitable vesiculating agents are the following:

p-diazo-diphenylamine sulfate
p-diazo-dimethyl aniline zinc chloride
p-diazo-diethyl aniline zinc chloride
p-diazo-ethyl-hydroxyethyl aniline one-half zinc chloride
p-diazo-methyl-hydroxyethyl aniline one-half zinc chloride
p-diazo-2,5 -diethoxy-benzoyl aniline one-half zinc chloride
p-diazo-ethyl-benzyl aniline one-half zinc chloride
p-diazo-dimethyl aniline borofluoride
p-diazo-2,5-dibutoxy-benzoyl aniline one-half zinc chloride
p-diazo-1-morpholino benzene one-half zinc chloride p-diazo-2,5-dimethoxy-1-p-toluyl-mercapto benzene one-half zinc chloride p-diazo-3-ethoxy-diethyl aniline one-half zinc chloride 2, 5, 4'-triethoxy-diphenyl-4-diazonium oxalate p-diazo-diethyl aniline one-half chloride p-diazo-2,5-dibutoxy-1-morpholino-benzene chloride zinc chloride p-diazo-2,5-dimethoxy-1-morpholino-benzene chloride zinc chloride p-diazo-2,5-diethoxy-1morpholino-benzene chloride one-half zinc chloride 2-diazo-1-naphthol-5-sulfonic acid p-diazo-diethyl aniline borofluoride p-diazo-2-chloro-diethyl aniline one-half zinc chloride.

Other suitable light-sensitive, nitrogen-forming compounds are the quinone-diazides (e.g.

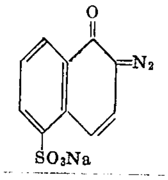

and azide compounds of the type

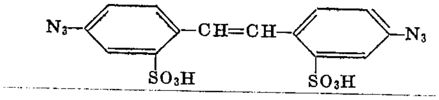

Also the carbazido (carboxylic acid azide) compounds containing a hydroxyl or amino-group in the position ortho to the carbazido group as described in U.S. Pat. No. 3,143,418 would be useful.

If a diazo compound is used, it is dissolved in a small quantity of a polar solvent such as methanol, aqueous methanol, acetonitrile or nitromethane and added dropwise to the stirred epoxy solution to minimize precipitation of either the salt or the polymer. The preferred amount of the diazo compound is about 7 to 8 percent by weight of the epoxy used. Increases in the amount of diazo compound up to about 10 wt. percent (based on epoxy polymer) give corresponding increases in sensitivity of the vesicular film. However, improvement in sensitivity with concentrations over 10 wt. percent is minimal and at concentrations of about 20 wt. and above, precipitation from solution tends to take place.

Solvents

Consistent with prior art procedures, the preferred technique is to formulate the resin vehicle and the materials to be disposed therein such as the vesiculating agent in a suitable solvent. A wide range of solvents can be used for the present epoxy resins. Since most of the commercial linear epoxies are supplied in the form of a solution, usually methyl-ethyl ketone, they are most conveniently used as supplied. If required or otherwise desired, other solvents suitable for present purposes are tetrahydrofuran, dioxane, 2-ethoxyethyl acetate, chlorinated solvents such as ethylene dichloride, toluene, and blends of solvents such as methylethyl ketone/butanol/toluene in a suitable parts of volume ration of 15/20/65.

Where a diazo compound is used as the vesiculating agent, it was noted above that the diazo compound is preferably dissolved in a small quantity of polar solvent. It is preferred, but not necessary, that the solvent in which the diazo compound is dissolved be compatible with the solvent selected for the epoxy resin. When the two solvents are compatible, the possibility of the diazo compound or the epoxy resin precipitating out on mixing of the two solutions is then minimized.

Dispersing Agents

It is understood in the art that a uniform dispersion of the vesiculating agent in the vehicle is desired. As an aid in accomplishing the dispersion it is conventional to use dispersing agents or surfactants and such techniques are contemplated in the present invention if desired. Typical dispersing agents which may be utilized for such a purpose are unrefined soya lecithin, refined soya lecithin and Saponin. When utilized, dispersing agents such as these have been found to improve the sensitivity of vesicular film of this invention.

In making a usable vesicular film, the resin vehicle containing the vesiculating agent and other ingredients which may be included is coated on a suitable support. The various materials known in the art for this purpose are contemplated. The most common material is the polyester film known by the trademark Mylar and this support will be used in the examples which follow. These examples illustrate the preparation and properties of vesicular film using an epoxy vehicle of this invention. In addition to the foregoing ingredients, other additives and treatments known in the art may be used as desired for the beneficial effects provided by them. For example, the hot fluid treatment described in U.S. Pat. No. 3,149,971 can be used in making the present vesicular film if desired.

The commercial epoxy resins (termed Phenoxy by Union Carbide) are all linear epoxy resins formed by the reaction of epichlorohydrin and Bisphenol A. As previously indicated, the variations in these commercial resins are in molecular weight distribution, amount of epoxy groups and the solvent in which it is supplied.

EXAMPLE I

A solution of Union Carbide's Phenoxy resin PKHH was prepared by stirring 7.5 g. of the resin pellets with 42.5 g. of 90:10 (by weight) mixture of tetrahydrofuran and methylethylketone at room temperature. To this stirred solution was added, dropwise, 0.6 g. of p-diazo-N,N-diethylaniline, zinc chloride, dissolved in 3.6 g. of methanol.

The resulting solution was coated on a 3 mil-thick Mylar (duPont) polyester film using a coating knife (a Bird film applicator) with a 6 mil clearance. The coatings were dried in a 90° C. circulating air oven for 10 minutes to give clear dry coatings approximately 0.7 mils thick.

One such coating was then immersed in ambient water (26° C.) for 10 minutes, and another for 1 minute in water maintained at 70° C. In the former case the coated film appeared to be unchanged while in the latter case it had assumed a distinct haze.

The water-treated coated films after wiping free of excess water were exposed to a source of ultra violet light (UV Products, Inc. lamp type 50058, 0.34 amp rating) located 2 inches from the film surface. The exposure was carried out in a stepwise manner so that exposure times of 3, 5, 7, 10, 15, 20, 40, 60 and 100 seconds could be evaluated.

The films so exposed were developed immediately in the usual manner by heating. The developing heat was provided by passage through a Canon "Kalfile" developer Model 160.

The sample of film water treated at room temperature gave vesiculation at exposures of 30 seconds and longer whereas the film water treated at 70° C. gave vesiculation at exposures of only 5 seconds and longer. The density of the images obtained with the long (100 second) exposure time was excellent, indicating low loss of nitrogen prior to developing.

EXAMPLE II

The procedure described in example I was repeated replacing p-diazo-N.N-diethylaniline, zinc chloride with an equal weight of p-diazo-N,N-diethylaniline, borofluoride. The film was water treated, exposed and developed as before to give a vesiculated film indistinguishable in sensitivity and image density from that in example I.

EXAMPLE III

A 20 wt. percent epoxy solution was prepared by diluting 23.5 g. of Shell's Eponol 55 L 32 (a 32 percent epoxy solution in 2ethoxyethylacetate) with 14.1 g. of methylethyl ketone. To this stirred solution was added dropwise 0.6 g. of the diazo compound p-diazo-N,N-diethylaniline, zinc chloride dissolved in 3.6 g. of methanol. The solution was coated, water treated, exposed and developed as in example I. The resultant vesicular densities at each exposure level were roughly equivalent to those obtained in example I.

EXAMPLE IV

The procedure described in example I was repeated except that the diazo compound used in example I was replaced with an equal weight of the half zinc chloride salt of p-diazo-N.-ethyl-N-hydroxethyl-aniline. The solution was coated, water-treated, exposed and developed as before. An improvement in sensitivity over that observed in example I was obtained such that an exposure time of only 3 seconds gave distinct vesiculation.

EXAMPLE V

The diazo salt in example I was replaced by an equal weight of the half zinc chloride of p-diazo-morpholino-benzene. The sensitivity of the resulting vesicular film was shown, after water treatment, exposure and development, to be approximately equivalent to that obtained in example IV.

EXAMPLE VI

A 20 wt. percent epoxy solution was prepared by diluting DOWS's DER 686 (a 40 percent solution in methylethyl ketone) with 7.9 g. of methylethyl ketone and 1.5 g. of tetrahydrofuran. To this stirred solution was added dropwise 0.3 g. of p-diazo-N,N-diethylaniline, zinc chloride dissolved in 1.8 g. of a 50/50 (by weight) mixture of methanol and water.

The resulting solution was coated, water treated, exposed and developed as in example I, giving vesicular densities approximately equivalent to those obtained in examples I and III.

EXAMPLE VII

DOW's DER 684 (a lower molecular weight version of DER 686 also in the form of a 40 wt. percent solution in methylethyl ketone) was used following the procedure in example VI and gave comparable results.

EXAMPLE VIII

Union Carbide's Phenoxy PKHS (a 40 wt. percent solution of Phenoxy PKHH in methylethyl ketone) was used following the procedure in example VI giving comparable results.

EXAMPLE IX

Shell's EPONOL 55 B40 (identical to the EPONOL 55 L32 of example III except that it is a 40 wt. percent solution in methylethyl ketone) evaluated as in example VI with equivalent results.

Example X

Union Carbide's Phenoxy PKHA (a 100 percent solids, lower molecular weight version of PKHH used in example I). 3.7 g. of this material dissolved in 1.5 g. of tetrahydydrofuran and 13.6 g. of methylethyl ketone followed by dropwise addition of 0.3 g. of p-diazo-N,N-d-ethylaniline, zinc chloride. This solution was coated, water-treated, exposed and developed as in example I to give equivalent results.

EXAMPLE XI

Union Carbide's Phenoxy PKHC (a molecular weight grade intermediate between the PKHH and PKHA grades) was evaluated exactly as described for the PKHA grade described in example X with equivalent results.

The following example illustrates the use of a linear epoxy resin made from a dihydroxy benzene instead of the Bisphenol A type of materials used in the preceding examples. The vehicle was prepared as follows:

Into a 250 ml. Erlenmeyer flask, fitted with a water-cooled condenser and magnetic stirring bar, was introduced 48.3 g. of Resorcinol Diglycidyl Ether (CIBA's ERE 1359 containing 0.79 epoxy equivalents per 100 g.), 21.0 g. Resorcinol (Baker, analytical grade), Ethanol (95 percent) 50 ml. and a solution of 1.1 g. of sodium hydroxide in 30 ml. water.

The contents of the flask were brought to reflux while stirring. After 30 minutes at reflux 10 mls. chlorobenzene were added, followed by another 10 ml. and 5 ml. of chlorobenzene after 45 minutes and after 60 minutes, respectively, of reflux time. After a further 4 hours at reflux the mixture was cooled and the water layer decanted off. The organic phase was washed with 2×100 ml. aliquots of water before being diluted with 200 ml. of 1,4-dioxane. This solution was acidified by stirring in 4.0 g. of 87 percent phosphoric acid dissolved in 20 ml. water. The poly(hydroxyether) was then precipitated by pouring the dioxane solution into a 500 ml. isopropanol, 50 ml. methanol mixture. The precipitated polymer pressed free of excess solvent was redissolved in dioxane and again precipitated from excess isopropanol. The polymer was placed in a vacuum oven and solvent removed by maintaining a slight flow of air at a pressure of about 20 cm. of mercury for 24 hours.

The product was obtained as almost colorless transparent flakes in a yield of 34.0 g.

EXAMPLE XII

A solution of the above resorcinol-derived epoxy was prepared by dissolving 7.5 g. of dioxane. After filtering to remove suspended particles, a solution of 0.6 g. of p-diazo-N,N-diethylaniline, zinc chloride in 2.0 g. of methanol was added to it slowly while stirring. The solution was coated, water treated and exposed as described in example I. Development of the latent image could not be satisfactorily carried out in the "Canon" Kalfile developer because of the relatively low softening temperature of the resorcinol derived epoxy resin. However, by placing the exposed film in a 90° C. oven for 5 seconds, vesiculation took place. High vesicular density was obtained even at the 5-second exposure level.

A test was performed to illustrate the improved thermal stability of the vesicles in an epoxy vehicle of this invention. For comparison a commercially available vesicular film offered by the Kalvar Corporation was subjected to the same test as follows:

An epoxy vesicular film was prepared as in example I using the 70° C/1 minute water treatment. A strip of this film was placed next to a strip of 16 mm. Kalvar film (5 mil base) and both covered by a Kodak No. 3 photographic step tablet so that adjacent areas on each film strip simultaneously received identical exposure levels. Exposure consisted of 20 seconds illumination at 6 inches from a 200-watt mercury short arc lamp using a CA-200 power supply (lamp and power supply obtained from Illumination Industries, Inc., Sunnyvale, California). Both strips were then developed simultaneously by passing through the Canon-Kalfile developer. The optical density of each step was then measured using a MacBeth TD-205 Transmission Densitometer, modified to obtain an *F* 4.5 aperture. The following readings were obtained for transmission density:

| Step Number | 1 | 2 | 3 | 4 | 5 | 6 |
|---|---|---|---|---|---|---|
| Epoxy | 1.50 | 1.49 | 1.40 | 1.35 | 1.01 | 0.78 |
| "Kalvar" | 1.52 | 1.49 | 1.38 | 1.27 | 1.05 | 0.77 |

The two filmstrips were then placed in a forced air oven for 20 minutes at 90° C. and then the transmission density of each step measured again. The following values were obtained:

| Step Number | 1 | 2 | 3 | 4 | 5 | 6 |
|---|---|---|---|---|---|---|
| Epoxy | 1.46 | 1.32 | 1.02 | 0.93 | 0.58 | 0.42 |
| Kalvar | 0.37 | 0.37 | 0.36 | 0.36 | 0.34 | 0.34 |

It can be seen from the above data that the epoxy film gives approximately the same density values as the Kalvar film after the initial development. However, exposure to 90° C. air for 20 minutes brings about a catastrophic drop in the optical density of the Kalvar film reducing all steps to approximately the same density. The epoxy vesicular film on the other hand does not suffer the same large drop in density at the high-density levels and a significant optical difference between each level is preserved. This characteristic of the epoxy vesicular film would be particularly important where recorded images on such film are to be preserved in an archival manner. The images should be able to survive large temperature fluctuations preserving both density and contrast.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A vesicular image forming element comprising:
a support, and a vehicle coated thereon containing a dispersed sensitizer capable of generating nitrogen upon exposure to radiation, said vehicle consisting essentially of a film-forming thermoplastic linear poly(hydroxy ether) polymer of an epihalohydrin and a dihydric phenol, said polymer having a nitrogen diffusitivity which permits internal formation of record-defining bubbles of nitrogen liberated by said sensitizer during heat-actuated development of said element following exposure to radiation.

2. A vesicular image forming element in accordance with claim 1 wherein said sensitizer is a diazo compound.

3. In a vesicular film, an improved vehicle for the vesiculating agent consisting essentially of a highly linear film-forming epoxy polymer of an epihalohydrin and a dihydric phenol selected from the group consisting of dihydroxy benzenes and a compound of the formula:

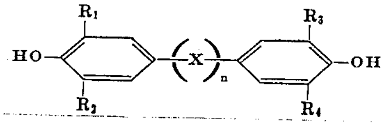

Awherein $R_1$, $R_2$, $R_3$, $R_4$ are hydrogen, halogen or lower alkyl; $n$ is an integer from 0–1, when $n$ is 1, X is $-CH_2-$, $-C(CH_3)_2-$, $-CH(CH_3)-$, $-CH(CH(CH_3)_2)-$,

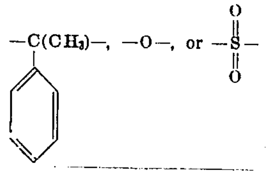

4. An improved vesicular film in accordance with claim 3 wherein said epihalohydrin is epichlorohydrin.

5. An improved vesicular film in accordance with claim 3 wherein said dihydric phenol is 2,2′-bis (p-hydroxy-phenyl) propane.

6. An improved vesicular film in accordance with claim 3 wherein said dihydric phenol is a m-dihydroxy benzene.

* * * * *

PO-1050
(5/69)

UNITED STATES PATENT OFFICE
CERTIFICATE OF CORRECTION

Patent No. 3,622,333 Dated November 23, 1971

Inventor(s) Oswald James Cope

It is certified that error appears in the above-identified patent and that said Letters Patent are hereby corrected as shown below:

Page 1, column 1, change the Assignee from "Micrex Corporation" to --Xidex Corporation--.

Signed and sealed this 23rd day of May 1972.

(SEAL)
Attest:

EDWARD M.FLETCHER,JR.
Attesting Officer

ROBERT GOTTSCHALK
Commissioner of Patents